United States Patent [19]
Higurashi

[11] Patent Number: 5,063,452
[45] Date of Patent: Nov. 5, 1991

[54] MAGNETIC RECORDING AND/OR REPRODUCING APPARATUS HAVING MEANS FOR PREVENTING AUDIO-TO-VIDEO CROSSTALK AND NOISE GENERATION

[75] Inventor: Seiji Higurashi, Fuchu, Japan

[73] Assignee: Victor Company of Japan Ltd., Kanagawa, Japan

[21] Appl. No.: 478,701

[22] Filed: Jan. 26, 1990

Related U.S. Application Data

[63] Continuation of Ser. No. 147,715, Jan. 25, 1988, abandoned.

[30] Foreign Application Priority Data

Jan. 27, 1987 [JP] Japan .................................. 62-16762
Oct. 16, 1987 [JP] Japan ................................. 62-261319

[51] Int. Cl.⁵ ............................................ H04N 5/782
[52] U.S. Cl. ..................................... 360/19.1; 360/66; 358/335; 358/341; 358/343
[58] Field of Search ...................... 360/66, 19.1, 33.1, 360/32; 358/335, 343

[56] References Cited

U.S. PATENT DOCUMENTS

| | | | |
|---|---|---|---|
| 3,262,124 | 7/1960 | Johnson et al. | 360/66 |
| 3,480,739 | 11/1969 | Kinkel | 360/66 |
| 3,946,147 | 3/1976 | Camras | 360/66 |
| 4,290,082 | 9/1981 | Hirai | 360/33.1 |
| 4,549,236 | 10/1985 | Fujiki | 360/19.1 |
| 4,591,930 | 5/1986 | Baumeister | 360/35.1 |
| 4,622,597 | 11/1986 | Hirota et al. | 360/19.1 |
| 4,691,246 | 9/1987 | Miura et al. | 360/19.1 |
| 4,729,042 | 3/1988 | Ishii | 358/343 |
| 4,743,980 | 5/1988 | Dakin | 358/343 |

FOREIGN PATENT DOCUMENTS 53-36778 3/1979 Japan.
58-78478 4/1983 Japan.

OTHER PUBLICATIONS

"A Study on the Digitization of Audio Signals for Video Tape Recorder", by Arai et al; Int'l Conf. on Acoustics, Speech and Signal Processing, pp. 29–33, ©1986.
IEEE Trans. on Consumer Electronics, vol. CE-30, No. 3, pp. 360, 368 (Aug. 1984), "HiFi VCR System", by Miura et al.

Primary Examiner—Roy N. Envall, Jr.
Assistant Examiner—Huy Nguyen
Attorney, Agent, or Firm—Michael N. Meller

[57] ABSTRACT

A magnetic recording apparatus comprising an audio signal processing circuit for converting an input analog audio signal into a digital audio signal; a modulating circuit for subjecting the digital audio signal to a modulation selected from a multi-phase differential phase shift keying modulation (DPSK) or an offset-multi-phase differential shift keying modulation (ODPSK) to produce a modulated digital audio signal; an adding circuit for adding a high-frequency bias signal to the modulated digital audio signal; an audio signal recording unit for recording the modulated digital audio signal with the high-frequency bias signal added thereto on a track formed in a deep layer portion of a magnetic layer of a magnetic tape; and a video signal recording circuit for recording an input video signal on a video track formed in a surface layer portion of the magnetic layer of the magnetic tape.

18 Claims, 9 Drawing Sheets

MAGNETIC RECORDING AND/OR REPRODUCING APPARATUS HAVING MEANS FOR PREVENTING AUDIO-TO-VIDEO CROSSTALK AND NOISE GENERATION

This application is a continuation of application Ser. No. 147,715, filed Jan. 25, 1988 now abandoned.

BACKGROUND OF THE INVENTION

The present invention generally relates to a magnetic recording and/or reproducing apparatus, and in particular to a magnetic recording and/or reproducing apparatus in which a digital audio signal which has been subjected to an offset-multi-phase differential phase shift keying modulation such as an offset-quadrature shift keying modulation, an offset-quadrature differential phase shift keying modulation, or a differential phase shift keying modulation such as a quadrature differential phase shift keying modulation is recorded in and/or reproduced from a deep layer portion of a magnetic layer of a magnetic tape, and a video signal is recorded in and/or reproduced from a surface layer portion of the magnetic layer. Furthermore, the present invention relates to a magnetic recording and/or reproducing apparatus in which a frequency modulated audio signal is recorded in and/or reproduced from the deep layer portion of the magnetic tape together with the modulated digital audio signal.

A magnetic recording and/or reproducing apparatus has been proposed in which a digital audio signal which has been modulated by a multi-phase differential phase shift keying is recorded in and/or reproduced from the deep layer portion of the magnetic tape, and the video signal is recorded in and/or reproduced from the surface layer portion of the magnetic tape. In the apparatus of this type, an input color video signal in conformance with a standard color system such as the NTSC standard system is converted into a frequency division multiplexed video signal in which a frequency converted carrier chrominance signal and a frequency modulated luminance signal are frequency division multiplexed. The carrier chrominance signal has been converted into a frequency range lower than that of the frequency modulated luminance signal. The frequency division multiplexed video signal is passed through a recording amplifier and a switching circuit, and is supplied to rotary video heads. The rotary video heads record the frequency division multiplexed video signal in a surface layer portion of a magnetic tape and form video tracks.

On the other hand, input right and left channel analog audio signals are respectively converted into pulse code modulated (PCM) signals and are subjected to a time division multiplexing process. A time division multiplexed PCM signal is modulated in accordance with offset-quadrature phase shift keying (hereafter referred to as OQPSK) modulation. An OQPSK-modulated digital audio signal is passed through a recording amplifier and a switching circuit and supplied to rotary audio heads. The rotary audio heads record the digital signal in a deep layer portion of the magnetic layer of the magnetic tape and form audio tracks.

During a reproducing operation, the frequency division multiplexed video signals read out from the video tracks by the rotary video heads are passed through the switching circuit and a video signal processing circuit. The processing circuit reproduces the original color video signal from the read-out video signal.

On the other hand, the digital audio signals read out from the audio tracks are passed through a switching circuit, a reproducing amplifier, an equalizer and an OQPSK demodulator, and supplied to a digital signal processing circuit where the reproduced original PCM signal is obtained. Thereafter, the reproduced PCM signal is converted into the original analog audio signal by a digital-to-analog converter, which simultaneously outputs the reproduced right and left channel audio signals.

As described above, in the conventional recording and/or reproducing apparatus having the rotary audio heads, the OQPSK modulated digital audio signal is directly recorded on the magnetic layer of the magnetic tape. This type of the recording and/or reproducing apparatus has been disclosed in the following document: Arai, et al, "A STUDY ON THE DIGITALIZATION OF AUDIO SIGNALS FOR VIDEO TAPE RECORDER", International Conference on Acoustics, Speech and Signal Processing, pp 29–33, 1986).

However, it should be noted that in the above magnetic recording and/or reproducing apparatus, the OQPSK modulated digital audio signal is directly recorded on the magnetic tape which has the non-linear transmission properties. Hence, a cross modulation distortion may occur. This causes a noise spectrum in a frequency range of the frequency converted carrier chrominance signal. It should be noted that no noise spectrum exists at the time of the recording.

For this reason, the noise spectrum included in the reproduced signal during the reproduction of the video signal by the rotary video heads degrades the color signal-to-noise ratio. Further, the distortion included in the reproduced audio signal because of the non-linearity of the magnetic tape during the reproduction of the audio signal by the rotary audio heads degrades the error rate of the reproduced digital audio signal.

Moreover, in order to record and reproduce the OQPSK-modulated digital audio signal on and from the magnetic tape, it is necessary to record and reproduce a reference phase signal at the same time when the OQPSK modulated digital audio signal is recorded and reproduced.

SUMMARY OF THE INVENTION

Accordingly, a general object of the present invention is to provide a novel and useful magnetic recording and/or reproducing apparatus in which the above disadvantages of the conventional magnetic recording and/or reproducing apparatus have been eliminated.

A more specific object of the present invention is to provide a magnetic recording and/or reproducing apparatus capable of reducing the noise spectrum.

Another object of the present invention is to provide a magnetic recording and/or reproducing apparatus in which the S/N ratio of the reproduced color video signal is improved.

Still another object of the present invention is to provide a magnetic recording and/or reproducing apparatus in which the error rate of the reproduced audio signal is improved.

A further object of the present invention is to provide a magnetic recording and/or reproducing apparatus in which it is unnecessary to record the reference phase signal.

The above objects of the present invention can be accomplished by a magnetic recording and/or reproducing apparatus comprising an audio signal processing circuit for converting an input analog audio signal into a digital audio signal; a modulating circuit for subjecting the digital audio signal to a modulation selected from a multi-phase differential phase shift keying modulation (DPSK) or an offset-multi-phase differential shift keying modulation (DPSK) to produce a modulated digital audio signal; an adding circuit for adding a high-frequency bias signal to the modulated digital audio signal; an audio signal recording unit for recording the modulated digital audio signal with the high-frequency bias signal added thereto on a track formed in a deep layer portion of a magnetic layer of a magnetic tape; and a video signal recording circuit for recording an input video signal on a video track formed in a surface layer portion of the magnetic layer of the magnetic tape.

According to another aspect of the present invention, a producing circuit for producing a frequency modulated (FM) audio signal, and an adding circuit for adding a high-frequency bias signal to the frequency division multiplexed audio signal are added to the above constitution.

According to still another aspect of the present invention, a fist signal extracting circuit for extracting the modulated digital audio signal from the read-out frequency division multiplexed audio signal, a second signal extracting circuit for extracting the FM audio signal from the read-out frequency division multiplexed audio signal, a first demodulating circuit for demodulating the modulated digital audio signal from the first signal extracting circuit, a second demodulating circuit for demodulating the FM audio signal from the second signal extracting circuit, and reproducing circuit for reproducing the video signal recorded in the surface layer portion of the magnetic tape.

Other objects, features and advantages of the present invention will become apparent from the following detailed description when read in conjunction with the accompanying drawings.

DETAILED DESCRIPTION

Figure 1:
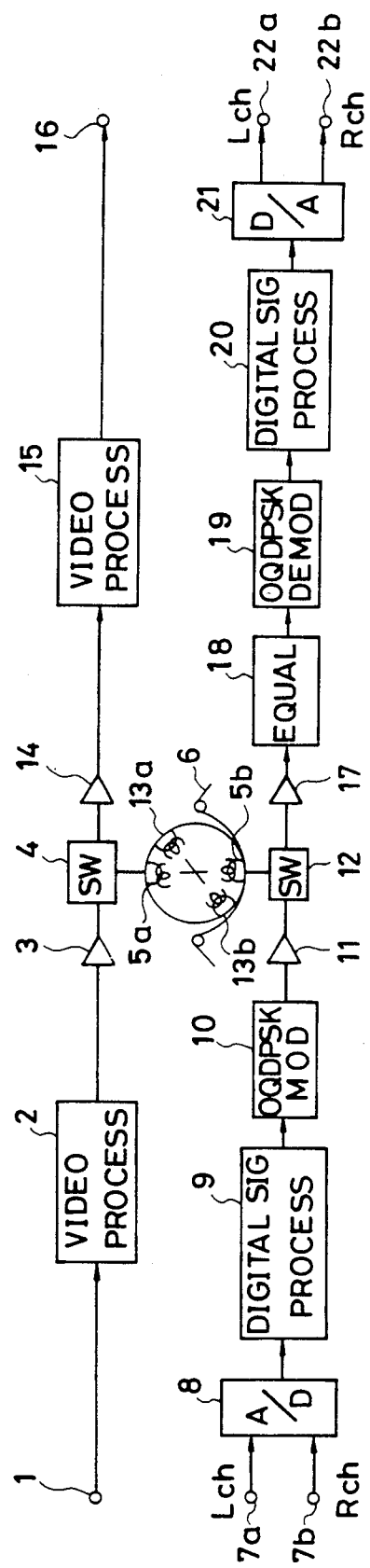
FIG. 1 is a block diagram of a conventional magnetic recording apparatus which is shown together with a magnetic reproducing apparatus.

To facilitate the understanding of the present invention, a description will be first given of a conventional magnetic recording and reproducing apparatus for magnetically recording and reproducing a digital audio signal which has been subjected to the OQPSK modulation on and from a magnetic tape using rotary heads, by referring to FIG. 1.

Referring to FIG. 1, a color video signal in conformance with the NTSC standard system is applied to an input terminal 1 and supplied to a video signal processing circuit 2. The processing circuit 2 separates the color video signal into a luminance signal and a carrier chrominance signal, frequency-modulates the luminance signal, frequency-converts the carrier chrominance signal into a frequency range lower than that of the frequency modulated (FM) luminance signal, and produces a frequency division multiplexed signal of the FM luminance signal and the frequency converted carrier chrominance signal. The frequency division multiplexed signal is passed through a recording amplifier 3 and a switching circuit 4 and supplied to rotary video heads 5a and 5b. The rotary video heads 5a and 5b record the frequency division multiplexed signal in a surface layer portion of a magnetic tape to form video tracks.

Right and left channel analog audio signals are respectively applied to input terminals 7b and 7a and supplied to an analog-to-digital (hereafter referred to A/D) converter 8. The output signal of the A/D converter 8 is fed to a digital signal processing circuit 9 in which the right and left channel digital audio signals are converted into a PCM signal, which is time division multiplexed. The time division multiplexed digital audio signal from the digital signal processing circuit 9 is OQPSK-modulated by an offset-quadrature phase shift keying modulator 10. The OQPSK-modulated digital audio signal from the OQPSK modulator is passed through a recording amplifier 11 and supplied to a switching circuit 12, which alternately provides the modulated digital audio signal to rotary audio heads 13a and 13b. The rotary audio heads 13a and 13b record in a deep layer portion of a magnetic layer of the magnetic tape 6 to form audio tracks in advance of forming the video tracks.

During the reproducing operation, the frequency division multiplexed video signals read out from the video tracks by the rotary video heads 5a and 5b are passed through the switching circuit 4 and a reproducing amplifier 14 to a video signal processing circuit 15. The processing circuit 15 converts the read-out video signal into the original color video signal, which is applied to an output terminal 16.

On the other hand, the digital audio signal read out from the audio track is passed through the switching circuit 12, a reproducing amplifier 17, an equalizer 18, and an OQPSK demodulator 19, and supplied to a digital signal processing circuit 20 where the reproduced original PCM signal is obtained. Thereafter, the reproduced PCM signal is converted into the original analog audio signal by a digital-to-analog converter 21, which separately and simultaneously outputs the reproduced right and left audio signals at output terminals 22b and 22a, respectively.

However, the above conventional apparatus has the disadvantages described previously. The present invention intends to eliminate the disadvantages.

A description will be given on an embodiment of a magnetic recording apparatus according to the present invention by referring to FIG. 2.

Figure 2:
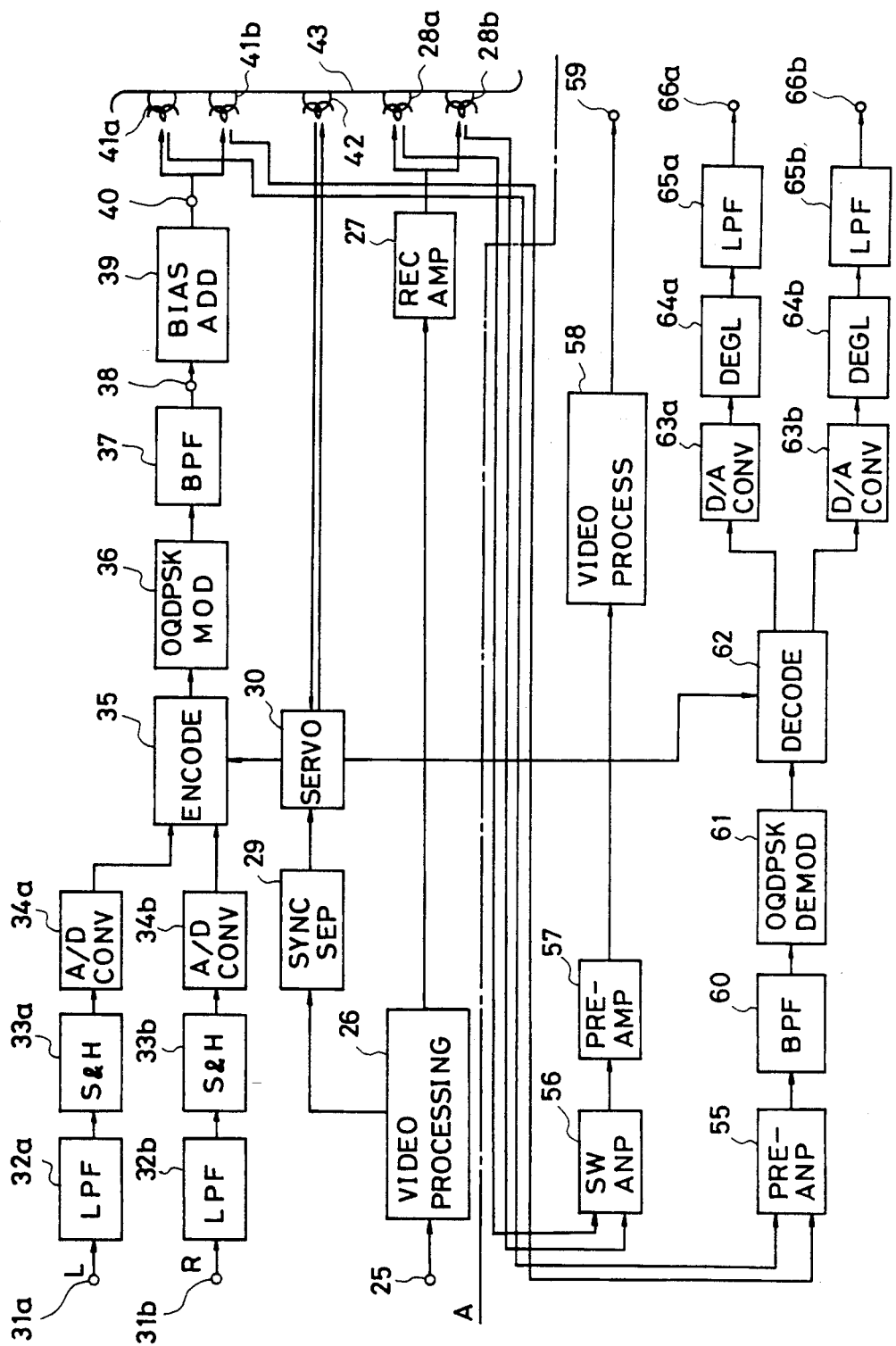
FIG. 2 is a block diagram of an embodiment according to the present invention.
Figure 3A:
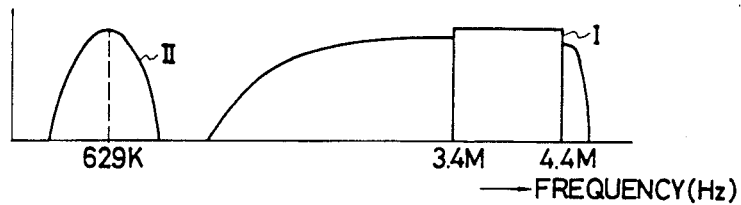
FIGS. 3A and 3B show examples of frequency spectrums of signals recorded on a magnetic tape by the apparatus according to the present invention.

FIG. 2 shows a block configuration of a magnetic recording apparatus according to the present invention together with a magnetic reproducing system. In FIG. 2, upper and lower parts separated by one-dotted chain line A show magnetic recording and reproducing systems, respectively. A color video signal in conformance with the NTSC standard system, for example, is applied to an input terminal 25 and supplied to a video signal processing circuit 26. The processing circuit 26 separates the color video signal into a luminance signal and a carrier chrominance signal, frequency-modulates the luminance signal, frequency-converts the carrier chrominance signal into a frequency range lower than that of the frequency modulated (FM) luminance signal, and produces a frequency division multiplexed signal of the FM luminance signal and the frequency converted carrier chrominance signal. The processing circuit 26 itself is known, and the frequency division multiplexed signal from the processing circuit 26 has a frequency spectrum shown in FIG. 3A. In FIG. 3A, the FM luminance signal I has a carrier frequency band of 3.4 MHz to 4.4 MHz, and the frequency converted carrier chrominance signal II has a converted center frequency of approximately 629 kHz.

The frequency division multiplexed signal from the processing circuit 26 is supplied to rotary video heads 28a and 28b via a recording amplifier 27 and a rotary transformer (not shown), and is recorded on a magnetic tape 43 so that video information amounting to one field is recorded on each video track formed obliquely to a longitudinal direction of the magnetic tape 43. The processing circuit 26 also supplies the color video signal which complies with the NTSC standard system to a synchronizing signal separating circuit 29. The separating circuit 29 separates a vertical synchronizing signal from the color video signal and supplies the vertical synchronizing signal to a servo circuit 30 which will be described later.

Right and left channel analog audio signals are respectively applied to input terminals 31b and 31a. The right and left analog audio signals are respectively passed through lowpass filters 32b and 32a wherein an unwanted high-frequency component exceeding an audio frequency band is eliminated. Output audio signals of the lowpass filters 32a and 32b are respectively supplied to analog-to-digital (A/D) converters 34a and 34b via respective sample and hold circuits 33a and 33b having a sampling frequency of 47.952 kHz ($=48$ kHz/1.001), for example, and are converted into digital signals constituted by 16-bit samples in accordance with the linear quantization of the quantization number of 16 bits. Right and left digital audio signals from the A/D converters 34a and 34b are supplied to an encoder 35.

When consecutive numbers are assigned to the samples constituting the right and left channel digital signals in the sampled sequence within one field of the video signal, the encoder 35 separates the samples constituting the right and left channel digital signals into odd numbered samples OS and even numbered samples ES (hereafter simply referred to as odd samples OS and even samples ES). Subsequently, the encoder 35 produces error check and correction codes P and Q having a format shown in FIG. 4(A) from the even samples ES and odd samples OS amounting to one field.

Figure 4:
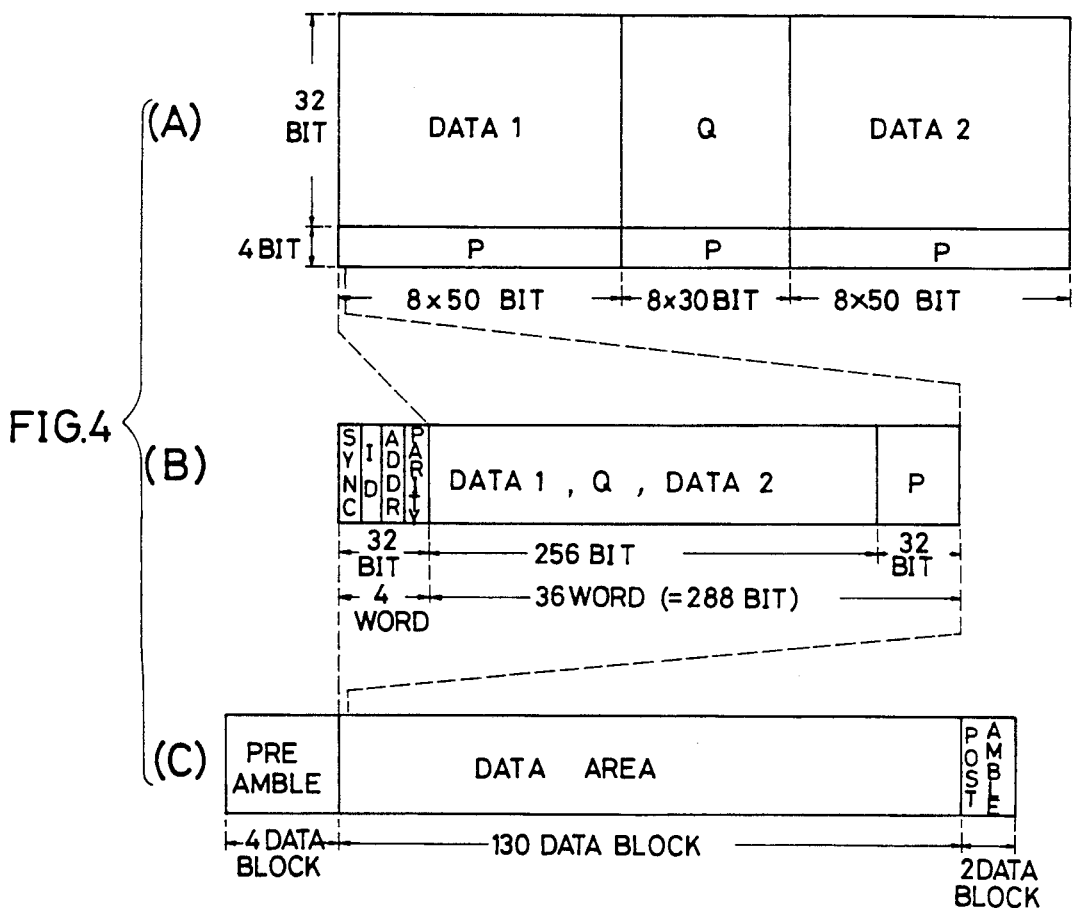
FIGS. 4(A) through 4(C) are diagrams for explaining an embodiment of a signal format of a digital audio signal which is recorded and reproduced in the apparatus according to the present invention.

In FIG. 4(A), a datum DATA1 is constituted by the even samples ES which have been subjected to a time base compression and an interleaving, and a datum DATA2 is constituted by the odd samples OS which have been subjected to a time base compression and an interleaving, for example. Each of the data DATA1 and DATA2 is constituted by words (one word is made up of 8 bits), and has $8 \times 50$ bits in total. The parity Q is produced as follows. Every 10 words of each of the data DATA1 and DATA2 are subsequently selected in each row. Then, one parity code composed of 6 words is produced by use of the selected 20 words in accordance with a predetermined operation. Hence, the parity Q having $8 \times 30$ bits ($=8 \times 6 \times 5$) is produced per row. The parity P is produced as follows. Every 32 words are selected in the vertical direction starting with the beginning of the datum DATA1. This operation is repeated until the last bit of the datum DATA2 is processed. The selected 32 words are subjected to a predetermined operation to produce 4 words or $8 \times 4$ bits per column.

The data DATA1 and DATA2 and the parities P and Q are divided every 36 words and a data block shown in FIG. 4(A) is formed. In FIG. 4(A), an 8-bit synchronizing signal SYNC, an 8-bit identification signal ID, an 8-bit address signal ADDR and an 8-bit block parity signal PARITY are added before the 36 words of the datum DATA1, parity Q, datum DATA2 and parity P, so that a data block of 40 words in total is constituted. For example, the upper 2 bits of the 8-bit identification signal ID constitute a cross fade control signal. For example, the cross fade control signal instructs a normal recording when the 2 bits have a value "00", a start of a recording when the 2 bits have a value "11", and an end of a recording when the 2 bits have a value "10".

The address signal ADDR instructs the sequence of each data block within the digital audio signal (that is, 130 data blocks) amounting to one track. The block parity signal PARITY is an error check signal obtained by an operation PARITY=ID+ADDR, where the symbol "+" denotes a modulo-2 addition. The data DATA1 and DATA2 and the parities P and Q are transmitted in a data area shown in FIG. 4(C) having 130 data blocks, but a preamble signal and a post-amble signal are respectively added before and after the data area for reproducing clock signals amounting to 4 and 2 data blocks, respectively. Accordingly, the digital audio signal is transmitted in 136 data blocks (=43,520 bits) in one field (=1/59.94 sec. in the case of the NTSC system) of the video signal. Therefore, the bit rate of the digital audio signal is 2.6086 (=136×320×59.94) Mbps. The encoder 35 is field-synchronized with the video signal to be recorded in accordance with the output signal of the servo circuit 30.

An encoded digital audio signal from the encoder 35 is supplied to an offset-quadrature differential phase shift keying (OQDPSK) modulator 36, which may be constituted by a conventional modulator. The conventional 4-phase DPSK consists of a serial/parallel conversion circuit, a phase shifting circuit, two code converting circuits, two balanced-modulator circuits and a composition circuit. The serial/parallel conversion circuit subjects the digital audio signal from the encoder 35 to the serial/parallel conversion and alternately outputs two parallel code sequences. The phase shifting circuit gives the two parallel code sequences a mutual phase difference amounting to $\frac{1}{2}$ of one time slot. The two code sequences are supplied to the respective code converting circuits (differential code converters). Each of the code converting circuits consists of an exclusive OR logic circuit and a one-time slot delay circuit. The output of the delay circuit is connected to one input of the exclusive OR logic circuit, and the other input thereof receives the respective code sequence. The outputs of the delay circuits are supplied to the respective exclusive OR logic circuits, which independently produce two converted code sequences made up of differential codes. The balanced-modulator circuits receive the respective differential codes as modulating signals, and independently balance-modulate (carrier-suppressed amplitude-modulate) two carriers of a predetermined frequency $f_c$ having a mutual phase difference of 90° by the two differential codes derived from the code converting circuits. The composition circuit combines the two modulated signals and produces the OQDPSK modulated digital signal.

The carrier frequencies of the carriers are desirably selected to be an integral multiple of a horizontal scanning frequency $f_H$, and for example, the carrier frequencies are selected to be 127 times the horizontal scanning frequency $f_H$ (that is, approximately 2.00 MHz in the case of the NTSC system). In addition, the transmission rate (recording bit rate) of the digital audio signal is selected to 2.6086 Mb/sec. Thus, the output digital audio signal of the OQDPSK modulator 36 has a known frequency spectrum which is shaped like the teeth of a comb and in which a maximum level occurs at the carrier frequency of 2.00 MHz, a zero level occurs at frequencies 1.30 MHz (=2.6086 MH/2) plus or minus 2.00 MHz, and a zero level similarly occurs at frequencies of 2.00 MHz±n×1.30 MHz, where n is a natural number.

Figure 3B:
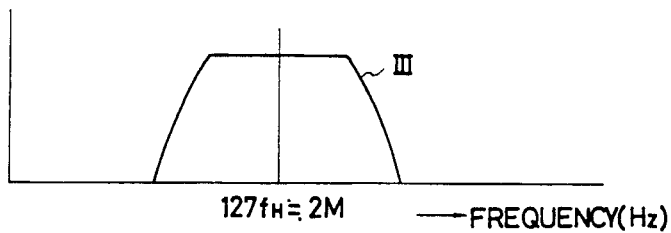

The output digital audio signal of the OQDPSK modulator 36 is supplied to a bandpass filter 37 which limits the frequency band so as to eliminate an unwanted frequency component. The bandpass filter 37 has a passband of approximately 0.7 times the transmission rate about the center frequency of 2.00 MHz, so as not to generate an inter-symbol interference. Therefore, a digital audio signal having a frequency spectrum III shown in FIG. 3(B) is obtained from the bandpass filter 37, passed through a terminal 38 and supplied to a bias adding circuit 39, where a high-frequency bias signal is added to the output signal of the bandpass filter 37.

Figure 5:
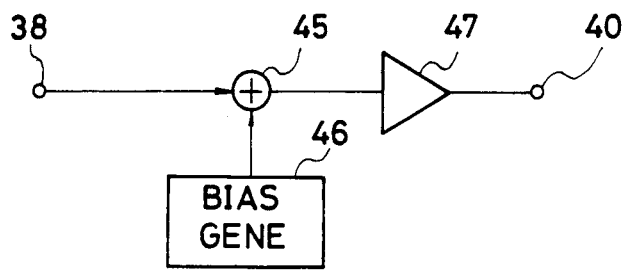
FIGS. 5 and 6 are circuit diagrams of examples of a high-frequency adding circuit employed in the apparatus according to the present invention.
Figure 6:
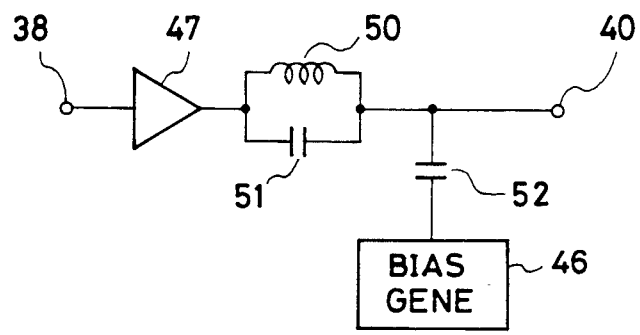
Figure 13:
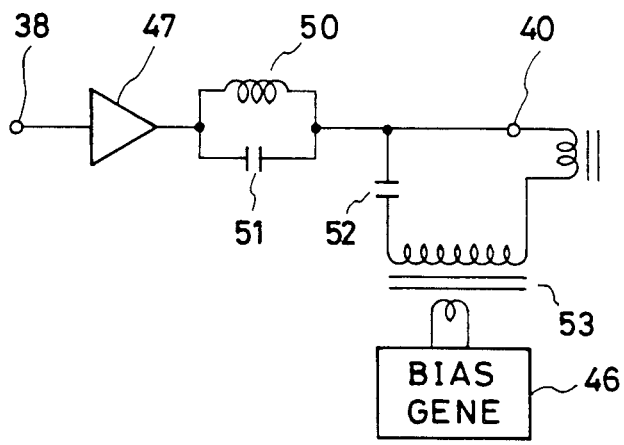
FIG. 13 shows a modification of the bias adding circuit shown in FIG. 6.

The bias adding circuit 39 is one of the essential features of the present invention. Configurations of examples of the bias adding circuit 39 are illustrated in FIGS. 5, 6 and 13. In these figures, the same reference numerals as those in FIG. 2 denote the same elements. In addition, the same reference numerals in FIG. 6 as those in FIG. 5 denote the same elements.

Referring to FIG. 5, the bias adding circuit 39 comprises an adder 45, a bias generator 46 and a recording amplifier 47. The adder 45 adds the digital audio signal applied thereto via a terminal which has been subjected to the OQDPSK modulation and a high-frequency bias signal of 7 MHz, for example, generated by the bias generator 46. The output signal of the adder 45 is amplified by the recording amplifier 47 and supplied to a terminal 40.

Referring to FIG. 6, the bias adding circuit 39 comprises the bias generator 46, the recording amplifier 47, a trap circuit composed of an inductor 50 and a capacitor 51 connected in parallel, and a capacitor 52. The digital audio signal which has been OQDPSK-modulated is passed through the recording amplifier 47 and extracted by the trap circuit. The extracted digital audio signal is added to the high-frequency bias signal produced by the generator 46, and is passed through the capacitor 52. The added result is supplied to the terminal 40.

The circuit shown in FIG. 6 is a known circuit for the bias recording. The trap circuit made up of the inductor 50 and the capacitor 51 prevents the the high-frequency bias signal from being transmitted from the generator 46 towards the recording amplifier 47. In addition, the capacitor 52 has a function of preventing the transmission of the digital audio signal towards the bias generator 46. The recording amplifier 47 shown in FIG. 6 may be constituted by a simple amplifier as compared with the recording amplifier 47 shown in FIG. 5 which has to have a wide frequency range as well as a high output power.

The high-frequency bias of a high voltage is required to flow a sufficient current through the rotary audio heads 41a and 41b against high impedances thereof due to the high-frequency of the bias signal. Hence, a high voltage power supply is required for the bias generator 46 of the circuit shown in FIG. 6. Such inconvenience to prepare the high voltage power supply can be avoided to modify the circuit to a circuit shown in FIG. 13, in which a step-up transformer 53 is used between the bias generator 46 and the capacitor 52.

In case a flying erase head (not shown) is used in the magnetic recording apparatus, the bias generator 46 can be shared with a signal source for the flying erase head.

Preferably, the frequency of the high-frequency bias signal is three times the frequency of the carrier. Preferably, the high-frequency bias signal is a sine wave having no distortion.

The bias-added signal at the terminal 40 is selectively supplied to rotary audio heads 41a and 41b via a rotary transformer (not shown). The rotary audio heads are mounted on a rotary drum (not shown) at positions having an angular separation of 180 degrees on a rotational plane of the rotary drum. The rotary video heads 28a and 28b are also mounted on the rotary drum at positions having an angular separation of 180 degrees on the rotational plane of the rotary drum, and the positions of the rotary video heads 28a and 28b respectively lead the rotary audio heads 41a and 41b by a predetermined angle (120°, for example) in a rotating direction of the rotary drum. Moreover, one of the rotary audio heads 41a and 41b has an azimuth angle of +30°, and the other has an azimuth angle of −30°. One of the rotary video heads 28a and 28b had an azimuth angle of +6°, and the other has an azimuth angle of −6°.

The servo circuit 30 supplies the vertical synchronizing signal from the separating circuit 29 to the encoder 35 so as to obtain field synchronization in the encoder 35. The servo circuit 30 also supplies the vertical synchronizing signal to a driving circuit (not shown) so that a drum motor (not shown) for rotating the rotary drum is driven by the driving circuit in synchronization with the vertical synchronizing signal.

The rotary audio heads 41a and 41b respectively record the digital audio signals with the high-frequency bias added thereto in the deep layer portion of the magnetic layer of the magnetic tape 43 which is wrapped obliquely around a peripheral surface of the rotary drum for an angular range of more than 180°, and form audio tracks. Subsequently, the rotary video heads 28a and 28b respectively record the video signals in the surface layer portion of the magnetic layer of the magnetic tape 43 and form video tracks. At the same time, servo circuit 30 also produces a control pulse signal from the vertical synchronizing signal and supplies the control pulse signal to a stationary control head 42. The stationary head 42 records the control pulse signal on and from a control track of the magnetic tape 43.

During a reproducing mode, signals reproduced by the rotary audio heads 41a and 41b from the deep layer portion of the magnetic tape 43 are supplied to a pre-amplifier 55. At the same time, signals reproduced by the rotary video heads 28a and 28b from the surface layer portion of the magnetic tape 43 are supplied to a switching amplifier 56. The control signal reproduced by the stationary head 42 from the control track of the magnetic tape 43 is supplied to the servo circuit 30. The servo circuit 30 controls the driving circuit described before and the rotary drum is controlled so that the reproduced control signal is synchronized to a reference frequency signal.

The switching amplifier 56 amplifies the reproduced signals from the rotary video heads 28a and 28b and also carries out a switching so as to obtain a continuous reproduced signal. The continuous reproduced signal from the switching amplifier 56 is supplied to a video signal processing circuit 58 via a pre-amplifier 57. The processing circuit 58 separates the continuous reproduced signal into the FM luminance signal and the frequency converted carrier chrominance signal, frequency-demodulates the FM luminance signal, frequency-converts the frequency converted carrier chrominance signal back into the original frequency band, and produces a color video signal which is in conformance with the NTSC system and which comprises the luminance signal and the carrier chrominance signal. The processing circuit 58 itself is known, and the reproduced color video signal from the processing circuit 58 is outputted via an output terminal 59.

On the other hand, a pre-amplifier 55 amplifies the reproduced digital signals from the rotary audio heads 41a and 41b and also carries out a switching so as to obtain a continuous reproduced signal. This continuous reproduced signal is supplied to a bandpass filter 60 wherein a reproduced signal having the frequency spectrum shown in FIG. 3(B) is separated, and this separated reproduced signal is supplied to an offset-quadrature differential phase shift keying (OQDPSK) demodulator 61. The OQDPSK demodulator 61 subjects the reproduced signal from the bandpass filter 60 to the OQDPSK demodulation and supplies a demodulated digital audio signal to a decoder 62.

The OQDPSK demodulator 61 may be constituted by a known demodulator which comprises two multiplying circuits, two operation circuits, two zero-cross comparators, a control circuit and a digital circuit. The multiplying circuits receives the respective carriers having a mutual phase difference of 90° and multiplies the carriers and the modulated digital audio signal from the bandpass filter 60. The operation circuits respectively carry out adding and subtracting calculations with respect to the outputs of the multiplying circuits. The zero-cross comparators respectively carry out a level-comparison for the output signals of the operating circuits. The control circuit multiplies the two output signals together, multiplies the multiplied result and the output signal of the operation circuit, and controls the phase of the carriers by the result of the second multiplying operation. The digital circuit composed of a D-type flip-flop, a phase locked loop, a frequency divider and an exclusive OR circuit, carries out a digital processing on two code sequences from the two zero-cross comparators which correspond to the differential codes, and produces a demodulated digital audio signal.

The decoder 62 is supplied with a vertical synchronizing signal from the servo circuit 30 which produces this vertical synchronizing signal in synchronization with the reproduced control signal. The decoder 62 carries out processes such as error correction, jitter compensation, time base expansion and de-interleaving in which the sampled signals are reorganized to produce the digital audio signal having the original sequence of the samples, and separates the reorganized samples into the right channel digital audio signal and the left channel digital audio signal.

The right and left channel digital audio signals are supplied to digital-to-analog (D/A) converters 63b and 63a and are converted into right and left channel analog audio signals. The right and left channel analog audio signals from the D/A converters 63b and 63a are respectively passed through deglitcher circuits 64b and 64a for eliminating a noise component which is generated during the digital-to-analog conversion. Output signals of the deglitcher circuits 64a and 64b are respectively passed through lowpass filters 65a and 65b for eliminating an unwanted high-frequency component exceeding the audio frequency band, and reproduced right and left channel analog audio signals are outputted via output terminals 66b and 66a.

A description will be given of effects on the reduction of the noise spectrum achieved by the present invention, compared to effects obtained by the conventional apparatus.

Figure 7:
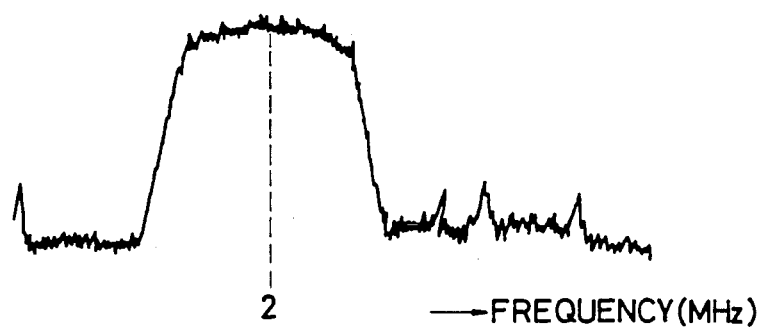
FIG. 7 shows an example of a frequency spectrum of a signal to be recorded on an audio track according to the embodiment shown in FIG. 2.

FIG. 7 shows an OQDPSK-modulated digital audio signal having a frequency spectrum of approximately 2.0 MHz±1.3 MHz. A case is now considered that the OQDPSK-modulated digital audio signal in FIG. 7 is recorded in the deep layer portion of the magnetic tape by the rotary audio heads according to the conventional apparatus, i.e., without the high-frequency bias signal added thereto, and subsequently the video signal is recorded in the surface layer portion of the magnetic layer formed on the deep layer portion by the rotary video heads. In this case, when the above magnetic tape is reproduced by the rotary audio heads, a frequency spectrum of the reproduced modulated digital audio signal is observed as shown in FIG. 8A.

Figure 8A:
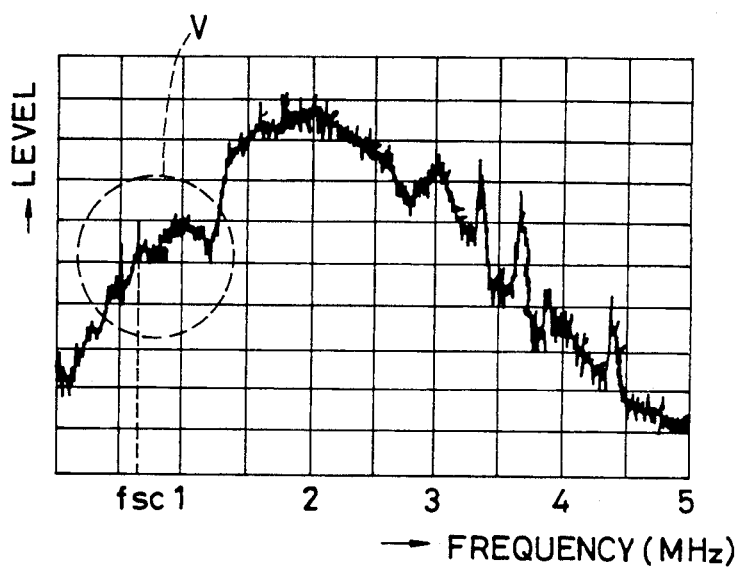
FIG. 8A shows a frequency spectrum obtained when a digital audio signal which has been subjected to an offset-quadrature differential phase shift keying modulation is recorded in a deep layer portion of a magnetic layer of a magnetic tape according to the conventional apparatus.

In FIG. 8A, a frequency fSC denotes a sub-carrier chrominance frequency of the frequency converted carrier chrominance signal having the frequency range lower than that of the frequency modulated luminance signal, and is equal to 629 kHz, for example. As seen from FIG. 8A, there is a noise spectrum (surrounded by a broken line V) of a higher level because of the cross modulation distortion in the frequency converted carrier chrominance signal band. The noise spectrum occurs in the low-frequency range in which the azimuth loss effect is less affected. For this reason, the noise also occurs on the video signal reproduced by the rotary video signal and degrades the color signal to noise ratio. In addition, the occurence of the cross modulation distortion results from the non-linearity of the magnetic tape and degrades the error rate of the digital audio signal, as described before.

Figure 8B:
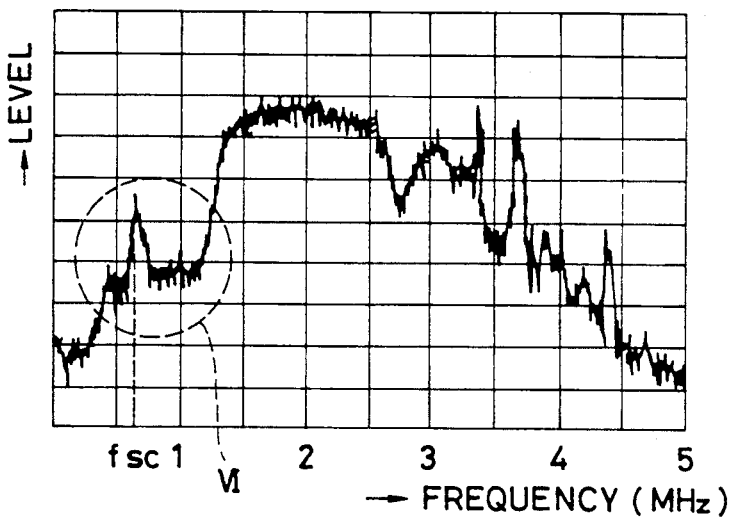
FIG. 8B shows a frequency spectrum obtained when a digital audio signal which has been subjected to the offset-quadrature differential phase shift keying modulation is recorded in the deep layer portion of the magnetic layer according to the present invention.

On the other hand, when the high-frequency bias signal of 5.5 MHz, for example, is added to the OQDPSK-modulated digital audio signal in FIG. 7, and is recorded in the deep layer portion of the magnetic tape, a frequency spectrum of the reproduced modulated digital audio signal is observed as shown in FIG. 8B. As clearly seen from FIG. 8B, out of noise frequency components surrounded by a broken line VI because of the cross modulation distortion in the frequency converted carrier chrominance signal band, noise frequency components in the vicinity of the frequency fSC of the frequency converted sub-carrier chrominance signal have been greatly reduced.

Figure 9A:
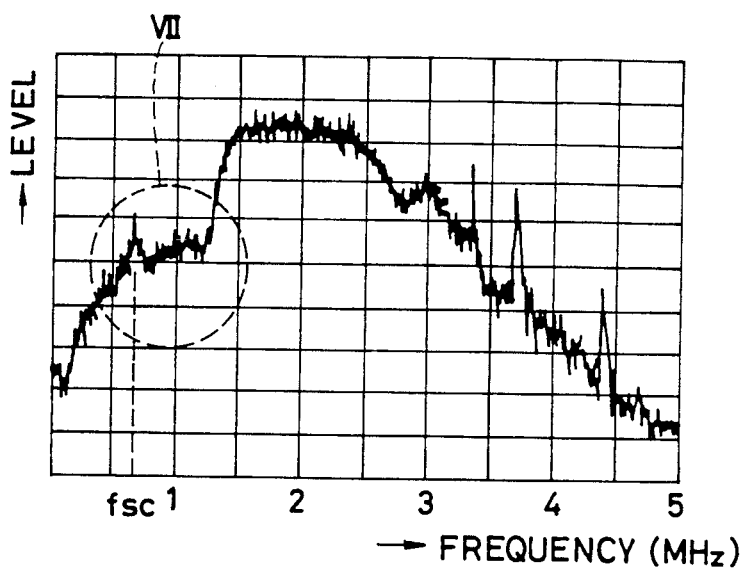
FIG. 9A shows a frequency spectrum obtained when a digital audio signal which has been subjected to a quadrature differential phase shift keying modulation is recorded in a deep layer portion of a magnetic layer of a magnetic tape according to the conventional apparatus.

FIG. 9A shows a frequency spectrum of the reproduced modulated digital audio signal obtained when in place of the OQDPSK modulation, a digital audio signal which has been subjected to QDPSK modulation and which has a frequency spectrum like that shown in FIG. 7 is directly recorded in the deep layer portion of the magnetic tape without the high-frequency bias signal added thereto by the rotary audio heads and is reproduced from the deep layer portion after recording the video signal in the surface layer portion. As in the case shown in FIG. 8A, noise frequency components (surrounded by a broken line VII) because of the cross modulation distortion in the frequency converted carrier chrominance signal range have large levels.

Figure 9B:
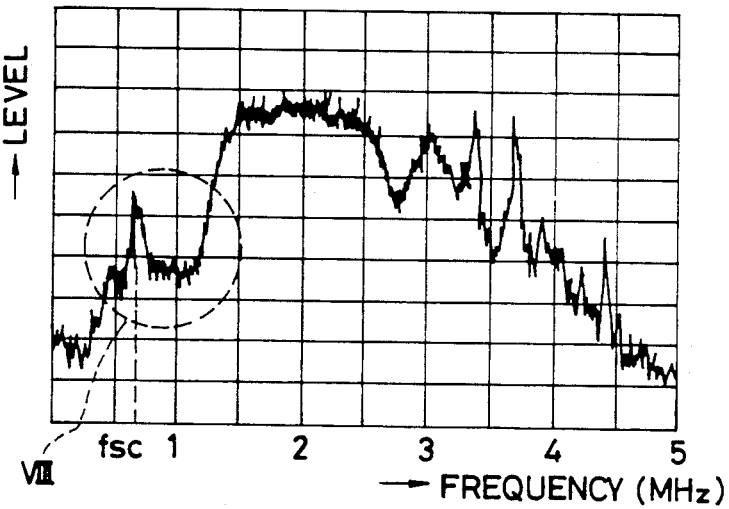
FIG. 9B shows a frequency spectrum obtained when a digital audio signal which has been subjected to the quadrature differential phase shift keying modulation is recorded in the deep layer portion of the magnetic layer according to the present invention.

On the other hand, FIG. 9B shows a frequency spectrum of the reproduced digital audio signal obtained when the high-frequency bias signal of 5.5 MHz, for example, is added to the QDPSK-modulated digital audio signal having the frequency spectrum like that shown in FIG. 7, and is recorded in the deep layer portion of the magnetic tape and reproduced therefrom after recording the video signal in the surface layer portion. Out of noise frequency components (surrounded by a broken line VIII) in the frequency converted carrier chrominance signal, noise frequency components in the vicinity of the frequency fSC of the frequency converted carrier chrominance signal have been greatly reduced. In FIGS. 8A, 8B, 9A and 9B, a signal component of a high level at a frequency of 3.4 MHz results from the crosstalk of the horizontal synchronizing signals in the FM luminance signal. The noise spectrums in the high-frequency range may be reduced by use of a bandpass filter.

The present invention may be applied to the digital audio signal which is subjected to multi-phase differential phase shift keying modulations other than the OQDPSK and QDPSK modulations such as the offset-2-phase and offset-8-phase differential phase shift keying modulations as well as the DPSK demodulation. Further, the present invention is applicable to the PAL system and SECAM system in addition to the NTSC standard system.

As described in the foregoing, according to the present invention, the addition of the high-frequency bias signal to the modulated digital audio signal to be recorded in the deep layer portion makes it possible to greatly reduce the noise spectrum which occurs in the frequency converted carrier chrominance signal of the reproduced video signal because of the cross modulation distortion resulting from the non-linearity of the magnetic tape. Hence, the color signal to noise ratio at the time of the reproduction can be improved.

Moreover, the digital audio signal which has been subjected to the multi-phase DPSK modulation or the offset-multi-phase DPSK modulation can be demodulated even when the reference phase signal is not present. For this reason, it is not necessary for the reference phase signal to be recorded on the magnetic tape. In addition, it is possible to reduce the transmission rate of the data compared to the digital audio signal which has been subjected to the OQPSK modulation. In other words, it is possible to make the frequency band narrower and improve the error rate of the reproduced digital audio signal.

Figure 10:
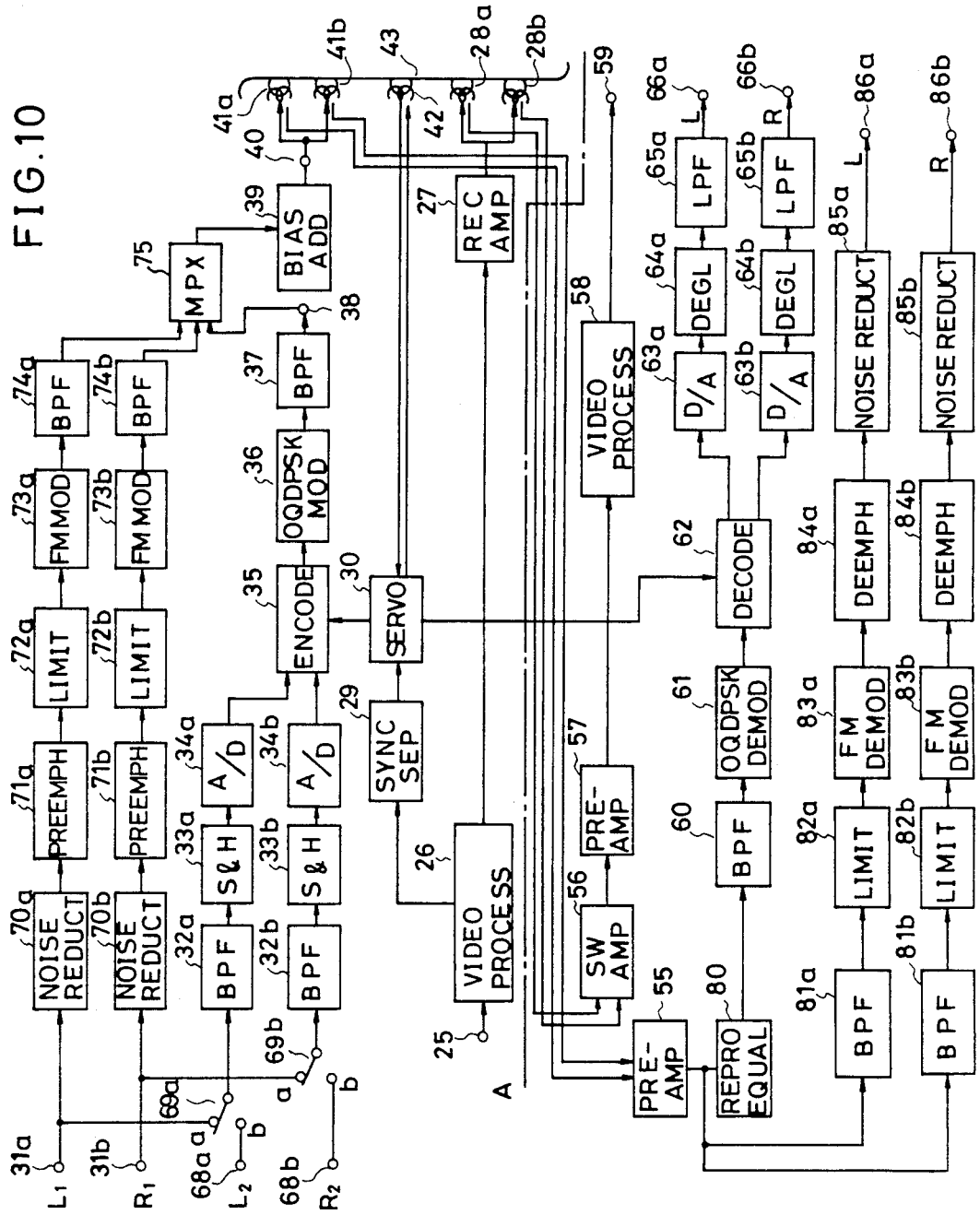
FIG. 10 is a block diagram of another embodiment according to the present invention.

A description will be given of another embodiment of the present invention with reference to FIG. 10. In FIG. 10, the same reference numerals as those in FIG. 2 denote the same elements.

One of the essential features of the embodiment shown in FIG. 10 is that both the frequency modulated (FM) audio signal and the digital audio signal can be recorded in and reproduced from the deep layer portion of the magnetic tape.

In FIG. 10, constitutions shown in upper and lower parts with respect to a one-dotted line A relate to magnetic recording and reproducing systems, respectively. The magnetic recording system includes a video signal recording system and audio signal recording systems composed of a first audio modulating part for producing the digital audio signal which has been modulated by the OQDPSK modulation and a second audio modulating part for producing a frequency modulated (FM) audio signal. The video signal recording system is the same as that shown in FIG. 2 except that the FM luminance signal modulated in the processing circuit 26 has a carrier band of 5.4 MHz to 7.0 MHz. For the audio signal recording systems, right and left channel analog audio signals which are related to the video signal, for example, are supplied to input terminals 31a and 31b. And other right and left channel analog audio signals which are independent of the video signal, for example, are supplied to input terminals 68a and 68b. When both the FM audio signal and the digital audio signal to be recorded are desired to be derived from a single program source supplied to the input terminals 31a and 31b, movable contacts of switching circuits 69a and 69b are moved to respective a terminals thereof. And when the FM audio signal and the digital audio signal are desired to be derived from two program sources which are different to each other, the movable contacts of the switching circuits 69a and 69b are moved to respective b terminals thereof.

The first audio modulating part is almost the same as the corresponding part shown in FIG. 2 except for the following. Firstly, the carrier frequencies fc used in the OQDPSK modulator 36 are selected to be approximately 3.0 MHz, which is 191 times the horizontal scanning frequency $f_H$. Secondly, the bandpass filter 37 has a passband with a center frequency of approximately 3.00 MHz and approximately 0.7 times the transmission rate. Thirdly, the frequency of the high-frequency bias signal at the bias adding circuit 39 is selected to be 10.8 MHz.

The second audio modulating part for producing the FM audio signal is constituted as follows. The right channel analog audio signal and the left channel analog audio signal applied to the input terminals 31b and 31a are supplied to noise reduction circuits 70b and 70a through switching circuits 69b and 69a, respectively. The noise reduction circuits 70a and 70b compress the dynamic range of the signals to half in decibels. The output signals of the noise reduction circuits 70a and 70b are subjected to the preemphasis characteristics of preemphasis circuits 71a and 71b, respectively. Limiters 72a and 72b eliminate a signal component having a level exceeding a predetermined level from the output signals of the preemphasis circuits 71a and 71b, respectively. The output signals of the limiters 72a and 72b are supplied to frequency modulators 73a and 73b, respectively. The frequency modulators 73a and 73b modulate carriers of frequencies of 1.3 MHz and 1.7 MHz by use of the output signals of the limiters 72a and 72b, respectively. The FM signals from the FM modulators 73a and 73b are passed through bandpass filters 74a and 74b and supplied to a multiplexing circuit 75. The multiplexing circuit 75 adds the OQDPSK modulated signal from the bandpass filter 37 to the FM signals to produce a frequency division multiplexed signal, and provide the bias adding circuit 39 with the frequency division multiplexed signal.

The bias adding circuit 39 adds the high-frequency bias signal of 10.8 MHz, for example, to the frequency division multiplexed signal from the mixing circuit 75. As described before, the bias adding circuit 39 may be constituted as shown in FIG. 5, FIG. 6 or FIG. 13. The outputs signal of the bias adding circuit 39 is supplied to the rotary audio heads 41a and 41b through a rotary transformer (not shown).

A description will be given on a reproducing system.

The reproducing system comprises two demodulating parts. A first demodulating part is for demodulating the OQDPSK modulated digital audio signal in accordance with the OQDPSK demodulation, and a second demodulating part if for demodulating the FM audio signal. The first demodulating part is the same as the constitution shown in FIG. 2 except for the presence of a reproduction equalizer 80 provided between the pre-amplifier 55 and the bandpass filter 60. The reproduction equalizer 80 compensates attenuated high-frequency signal components and provides the bandpass filter 60 with a compensated audio signal.

The second demodulating part is constituted as follows. The output signal of the pre-amplifier 55 is also supplied to bandpass filters 81a and 81b. The bandpass filters 81a and 81b extract desired frequency components. Limiters 82a and 82b eliminate frequency components having a level exceeding a predetermined level from the output signals of the bandpass filters 81a and 81b. Frequency demodulators 83a and 83b carry out the frequency demodulation on the output signals of the limiters 82a and 82b, respectively. The demodulated audio signals from the frequency demodulators 83a and 83b are subjected to the deemphasis characteristics of deemphasis circuits 84a and 84b, respectively. Noise reduction circuits 85a and 85b expand the dynamic ranges of the output signals of the deemphasis circuits 84a and 84b to restore the original ranges. The output signals of the noise reduction circuits 85a and 85b are supplied to output terminals 86a and 86b as left and right channel audio signals, respectively.

A description will be given on effects provided by the present invention on the reduction of the noise spectrums with reference to FIGS. 11, 12A and 12B.

Figure 11:
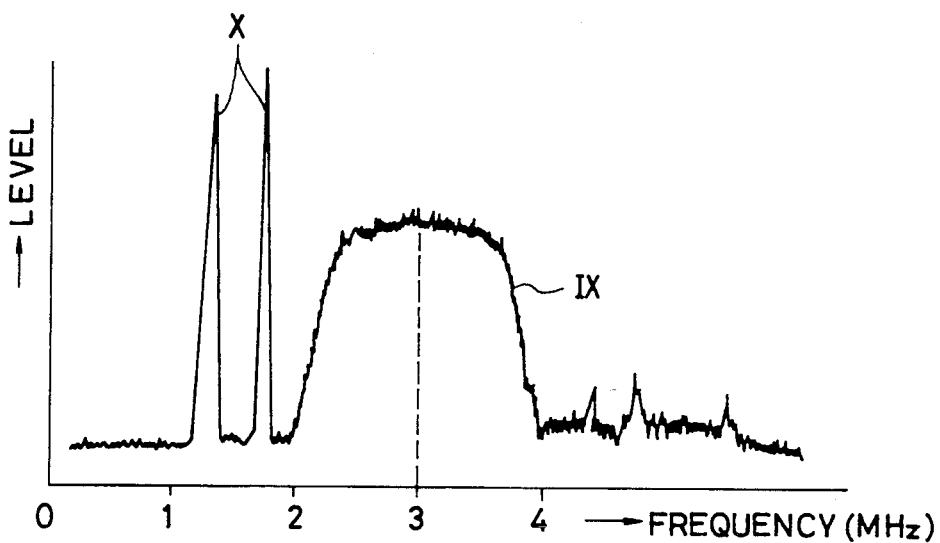
FIG. 11 shows an example of a frequency spectrum of a signal to be recorded according to the embodiment shown in FIG. 10.

FIG. 11 shows an OQDPSK modulated digital audio signal VIIII having a frequency spectrum of approximately 3.0 MHz±1.3 MHz, and a frequency modulated audio signal X.

Figure 12A:
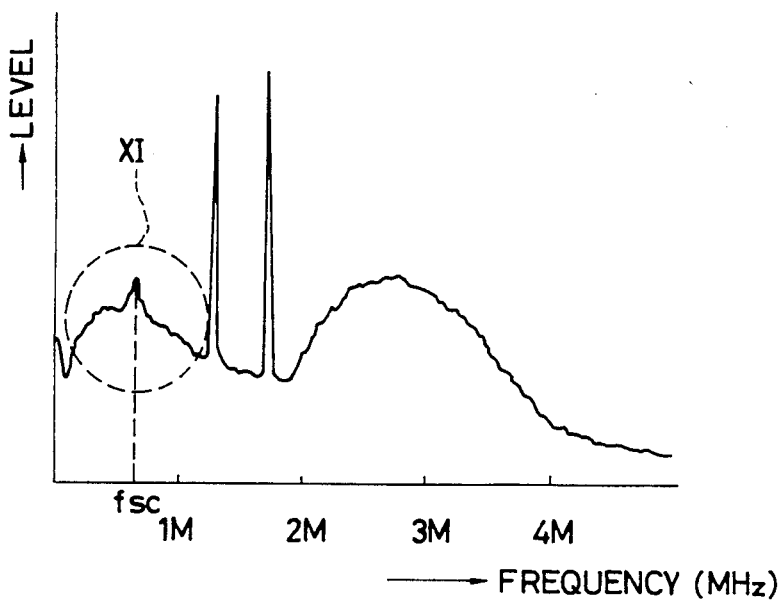
FIGS. 12A shows a frequency spectrum obtained when a digital audio signal which has been subjected to the offset-quadrature differential phase shift keying modulation is recorded in the deep layer portion of a magnetic layer of a magnetic tape according to the conventional apparatus.

FIG. 12A shows a frequency spectrum of the reproduced modulated digital audio signal and the FM audio signal in the case where the signal having the frequency spectrums shown in FIG. 11 is directly recorded in the deep layer portion of the magnetic tape by the rotary audio heads without adding the high-frequency bias signal, and subsequently the video signal is recorded in the surface layer portion of the magnetic tape by the rotary video heads, and then the audio signals are reproduced by the rotary audio heads. In FIG. 12A, fSC denotes a frequency of the frequency converted sub-carrier chrominance signal. The frequency fSC is 629 kHz, for example. In the frequency converted carrier chrominance signal band, as indicated by a broken line IX, there exists a noise spectrum of a high level because of the cross modulation distortion. The noise spectrum also occurs in the low frequency range in which the azimuth loss effect is less affected. This leads to the degradation of the color S/N ratio. In addition, the non-linearity of the magnetic tape distorts the reproduced signal and degrades the error rate thereof. The non-linearity also degrades the ratio of the carrier of the FM audio signal to noise, i.e., S/N ratio.

Figure 12B:
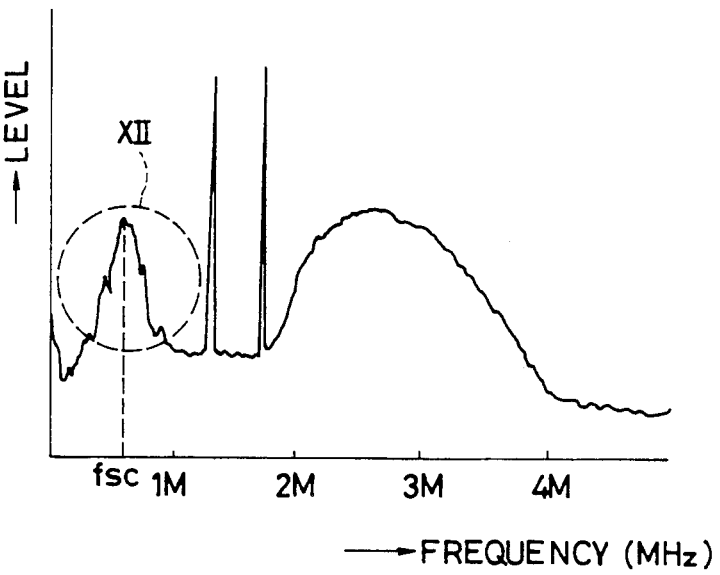
FIG. 12B shows a frequency spectrum obtained when a digital audio signal which has been subjected to the offset-quadrature differential phase shift keying modulation is recorded in the deep layer portion of the magnetic layer according to the embodiment shown in FIG. 10.

On the other hand, FIG. 12B shows frequency spectrums of the reproduced modulated digital audio signal and the FM audio signal in the case where the frequency division multiplexed signal of the OQDPSK modulated digital audio signal and the FM audio signal is recorded in the deep layer portion of the magnetic tape with the high-frequency bias signal (10.8 MHz, for example) added thereto, and subsequently the video signal is recorded in the surface layer portion of the magnetic tape, and then the audio signals are reproduced from the magnetic tape by the rotary audio heads. As seen from FIG. 12B, out of noise spectrums (surrounded by a broken line XII) because of the cross modulation distortion in the frequency converted carrier chrominance signal range, noise spectrums in the vicinity of the frequency converted sub-carrier chrominance frequency fSC are extremely reduced. High-frequency components of the signal shown in FIG. 12B may be equalized to the spectrums shown in FIG. 3B by use of the reproduction equalizer 80.

In the present invention, the addition of the high frequency bias to the digital audio recording signal serves not only the improvement in the distortion of the digital audio signal itself but also decreases a noise included in the low-frequency range of the digital audio signal and caused by the cross modulation distortion, which noise transmits a crosstalk to the video signal.

TABLE I and TABLE II show experimental results of the measurement of various S/N ratios. TABLE I shows measured S/N ratios in a standard-speed mode (so-called SP mode), and TABLE II shows measured S/N ratios in an extended play mode (so-called EP mode). In these tables, columns designated by a character "Y" refer to a reproduced luminance signal to noise ratio, columns designated by a character "C.AM" refer to a reproduced chrominance signal to noise ratio associated with an amplitude noise, and columns designated by a character "C.PM" are relative to a reproduced chrominance signal to noise ratio associated with a phase noise. Values are shown in units of dB. In the experiment, the recording and reproducing apparatus having the structure shown in FIG. 10 was used for recording and reproducing the frequency division multiplexed video signal and the PCM audio signal which was subjected to the OQDPSK modulation in and from the deep layer portion and the surface layer portion, respectively.

TABLE I

| Bias | Y | C.AM | C.PM |
|---|---|---|---|
| Applied | 49.8 | 48.8 | 44.6 |
| Not applied | 49.2 | 47.4 | 44.2 |
| Difference | 0.6 | 1.4 | 0.4 |

TABLE II

| Bias | Y | C.AM | C.PM |
|---|---|---|---|
| Applied | 47.3 | 43.4 | 41.5 |
| Not applied | 45.0 | 41.4 | 38.5 |
| Difference | 2.3 | 2.0 | 3.0 |

As seen from the above tables, the frequency converted carrier chrominance signal to noise ratio is improved by the application of the high-frequency bias signal. This means that the noise spectrum which occurs in the frequency converted carrier chrominance signal of the reproduced video signal due to the cross modulation distortion is reduced.

According to the configuration shown in FIG. 10, in addition to the advantages provided by the configuration shown in FIG. 2 discussed in the foregoing, the following advantages can be obtained. When an audio signal related to a video signal is recorded as both the FM signal and the digital audio signal, it becomes possible to eliminate an inconvenience that two different kinds of recorded tape softwares must be prepared. That is, the software recorded in this way can be reproduced even by a conventional VTR having a reproducing function for the FM audio signal but having no reproducing function for the digital audio signal. Further, it is possible to independently utilize the FM audio and the PCM audio. For example, it is possible to record a stero audio from the television set and a stereo audio from the compact disc apparatus or the digital audio tape recorder. In the foreign language program on the TV, an original stereo may be recorded as the digital audio, and a stereo audio dubbed in domestic language may be recorded as the FM audio.

The present invention is not limited to the embodiments described above, but various variations and modifications may be made without departing from the scope of the present invention.

What is claimed is:

1. A magnetic recording apparatus comprising:
   audio signal processing means for converting an input analog audio signal into a digital audio signal;
   modulating means for subjecting the digital audio signal to a modulation selected from a multi-phase differential phase shift modulation (DPSK) and an offset-multi-phase differential shift keying modulation (ODPSK) to produce a modulated digital audio signal;
   adding means for adding a high-frequency bias signal to the modulated digital audio signal;
   audio signal recording means for recording the modulated digital audio signal with the high-frequency bias signal added thereto on an audio track formed in a deep layer portion of a magnetic layer of a magnetic tape; and
   video signal recording means for recording an input video signal on a video track formed in a surface layer portion of the magnetic tape, the video track being formed subsequent to the forming of the audio track, the video track being formed and the audio track respectively being formed by corresponding heads having different azimuth angles, said input video signal including a luminance signal and a carrier chrominance signal which is frequency converted into a range lower than that of the luminance signal so that a frequency band of the modulated digital audio is higher than a frequency band of the frequency converted carrier chrominance, said high-frequency bias signal being added to the modulated digital audio signal in order to prevent a noise caused by a cross modulation distortion generated by the non-linearity of the magnetic tape and the modulated digital audio signal itself, said noise degrading the frequency converted carrier chrominance signal in said range in which the azimuth loss effect is less affected, and said noise being reproduced as a crosstalk from the audio track when the video track is scanned.

2. A magnetic recording apparatus as claimed in claim 1, wherein the adding means comprises a bias generator for generating the high-frequency bias signal, an adder for adding the high-frequency bias signal to the modulated digital audio signal, and a recording amplifier for amplifying the output signal of the adder.

3. A magnet recording apparatus as claimed in claim 1, wherein the adding means comprises a recording amplifier for amplifying the modulated digital audio signal, a trap circuit for extracting only the modulated digital audio signal, and a bias generator for generating the high-frequency bias signal and wherein the high-frequency bias signal from the bias generator is passed through a capacitor and added to the output of the trap circuit.

4. A magnetic recording apparatus as claimed in claim 3, wherein the trap circuit comprises an inductor and a capacitor connected in parallel.

5. A magnetic recording apparatus as claimed in claim 1, wherein a frequency of the high-frequency bias signal is approximately three times or more the frequency of a carrier frequency of the demodulated digital audio signal.

6. A magnetic recording apparatus as claimed in claim 1, wherein the high-frequency bias signal is a sine wave.

7. A magnetic recording apparatus comprising:
audio signal processing means for converting an input analog audio signal into a digital audio signal;
modulating means for subjecting the digital audio signal to a modulation selected from a multi-phase differential phase shift keying modulation (DPSK) and an offset-multi-phase differential shift keying modulation (ODPSK) to produce a modulated digital audio signal;
producing means for producing frequency modulated (FM) audio signals;
multiplexing means for frequency division multiplexing the modulated digital audio signal and the FM audio signal;
adding means for adding a high-frequency bias signal to the frequency division multiplexed audio signals;
audio signal recording means for recording the frequency division multiplexed audio signal with the high-frequency bias signal added thereto on an audio track formed in a deep layer portion of a magnetic layer of a magnetic tape; and
video signal recording means for recording an input video signal on a video track formed in a surface layer portion of the magnetic layer of the magnetic tape, the video track being formed subsequent to the forming of the audio track, the video track being formed and the audio track respectively being formed by corresponding heads having different azimuth angles, said input video signal including a luminance signal and a carrier chrominance signal which is frequency converted into a range lower than that of the luminance signal so that a frequency band of the modulated digital audio signal is higher than a frequency band of the frequency converted carrier chrominance, said high-frequency bias signal being added to the modulated digital audio signal in order to prevent a noise caused by a cross modulation distortion generated by the non-linearity of the magnetic tape, the modulated digital audio signal itself, and the frequency modulated audio signals, said noise degrading the frequency converted carrier chrominance signal in said range in which the azimuth loss effect is less affected, and said noise being reproduced as a crosstalk from the audio track when the video track is scanned.

8. A magnetic recording apparatus as claimed in claim 7, wherein the adding means comprises a bias generator for generating the high-frequency bias signal, an adder for adding the high-frequency bias signal to the frequency division multiplexed audio signal, and a recording amplifier for amplifying the output signal of the adder.

9. A magnetic recording apparatus as claimed in claim 7, wherein the adding means comprises a recording amplifier for amplifying the frequency division multiplexed audio signal, a trap circuit for extracting only the frequency division multiplexed audio signal, and a bias generator for generating the high-frequency bias signal and wherein the high-frequency bias signal from the bias generator is passed through a capacitor and added to the output of the trap circuit.

10. A magnetic recording apparatus as claimed in claim 9, wherein the trap circuit comprises an inductor and a capacitor connected in parallel.

11. A magnetic recording apparatus as claimed in claim 7, wherein a frequency of the high-frequency bias signal is approximately three times or more the frequency of a carrier frequency of the demodulated digital audio signal.

12. A magnetic recording apparatus as claimed in claim 7, wherein the high-frequency bias signal is a sine wave.

13. A magnetic recording apparatus comprising:
audio signal processing means for converting an input analog audio signal into a digital audio signal;
modulating means for subjecting the digital audio signal to a modulation selected from a mulit-phase differential phase shift keying modulation (DPSK) and an offset-multi-phase differential shift keying modulation (ODPSK) to produce a modulated digital audio signal;
producing means for producing frequency modulated (FM) audio signals;
multiplexing means for frequency division multiplexing the modulated digital audio signal and the FM audio signals;
adding means for adding a high-frequency bias signal to the frequency division multiplexed audio signals;
audio signal recording means for recording the frequency division multiplexed audio signal with the high-frequency bias signal added thereto on an audio track formed in a deep layer portion of a magnetic layer of a magnetic tape; and
video signal recording means for recording an input video signal on a video track formed in a surface layer portion of the magnetic layer of the magnetic tape, the video track being formed subsequent to the forming of the audio track, the video track and the audio track respectively being formed by corresponding heads having different aximuth angles, said input video signal including a luminance signal and a carrier chrominance signal which is frequency converted into a range lower than that of the luminance signal so that a frequency band of the modulated digital signal is higher than a frequency band of the frequency converted carrier chrominance, said high-frequency bias signal being added to the modulated digital audio signal in order to prevent a noise caused by a cross modulation distortion generated by the non-linearity of the magnetic tape, the modulated digital audio signal itself, and the frequency modulated audio signals, said noise degrading the frequency converted carrier chrominance signal in said range in which the azimuth loss effect is less affected, and said noise being reproduced as a crosstalk from the audio track when the video track is scanned.

14. A magnetic recording apparatus as claimed in claim 13, wherein the adding means comprises a bias generator for generating the high-frequency bias signal, an adder for adding the high-frequency bias signal to the frequency division multiplexed audio signal, and a recording amplifier for amplifying the output signal of the adder.

15. A magnetic recording apparatus as claimed in claim 13, wherein the adding means comprises a recording amplifier for amplifying the frequency division multiplexed audio signal, a trap circuit for extracting only the frequency division multiplexed audio signal, and a bias generator for generating the high-frequency bias signal and wherein the high-frequency bias signal from the bias generator is passed through a capacitor and added to the output of the trap circuit.

16. A magnetic recording apparatus as claimed in claim 15, wherein the trap circuit comprises an inductor and a capacitor connected in parallel.

17. A magnetic recording apparatus as claimed in claim 13, wherein a frequency of the high-frequency bias signal is approximately three times or more the frequency of a carrier frequency of the demodulated digital audio signal.

18. A magnetic recording apparatus as claimed in claim 13, wherein the high-frequency bias signal is a sine wave.

* * * * *